United States Patent [19]

Lipshield

[11] 4,127,042

[45] Nov. 28, 1978

[54] BRAKE CABLE OPERATING MEANS OF THE OVERCENTER TOGGLE TYPE

[75] Inventor: Eugene C. Lipshield, Moberly, Mo.

[73] Assignee: Orscheln Brake Lever Mfg. Company, Moberly, Mo.

[21] Appl. No.: 806,963

[22] Filed: Jun. 16, 1977

[51] Int. Cl.² .................. G05G 1/04; G05G 5/06; F16D 65/38

[52] U.S. Cl. .................. 74/520; 74/535; 74/537; 74/540; 74/524; 74/529; 188/196 M

[58] Field of Search .................. 74/519, 520, 523, 470, 74/502, 491, 575, 501, 524, 489, 487, 525, 533, 535, 534, 537, 540, 541

[56] References Cited

U.S. PATENT DOCUMENTS

| | | | |
|---|---|---|---|
| 1,222,429 | 4/1917 | Linton | 74/491 |
| 1,229,968 | 6/1917 | Jones | 74/491 |
| 2,171,403 | 8/1939 | Orscheln | 74/523 X |
| 2,464,096 | 3/1949 | Orscheln | 188/196 R X |
| 2,464,097 | 3/1949 | Orscheln | 188/196 M X |
| 2,531,095 | 11/1950 | Williams | 74/501 R X |
| 2,954,248 | 9/1960 | Brickman | 74/501 R |
| 3,036,476 | 5/1962 | Klepper | 74/501 X |
| 3,240,293 | 3/1966 | Ferguson et al. | 74/501 |
| 3,379,074 | 4/1968 | Hirst, Jr. | 74/470 |

FOREIGN PATENT DOCUMENTS

| | | | |
|---|---|---|---|
| 983,154 | 6/1951 | France | 74/489 |
| 226,266 | 12/1924 | United Kingdom | 74/489 |
| 325,820 | 2/1930 | United Kingdom | 74/489 |

Primary Examiner—Benjamin W. Wyche
Assistant Examiner—Don E. Ferrell
Attorney, Agent, or Firm—Lawrence E. Laubscher

[57] ABSTRACT

An improved brake lever assembly of the overcenter toggle type is disclosed, wherein the brake operating lever is preferably pivotally connected with the stationary mounting plate assembly about a pivot axis that is laterally displaced from the linear axis of travel of an inner cable member relative to the concentrically arranged tubular outer sheath, thereby to reduce wear of the inner cable guide means. According to a first feature of the invention, an improved anchor plate or anchor plate arrangement is provided for connecting one end of the outer sheath member with one end of the stationary mounting plate assembly. In accordance with a second feature, a ratchet and pawl assembly is provided for releasably locking the operating lever in various angular positions relative to the mounting plate assembly. In order to effect reserve travel of the operating lever beyond the normal brake fully applied position, the bow-shaped connecting link may include a plurality of pivotally connected sections that are foldable about the pivot axis of the operating lever, thereby to permit additional tensioning of the inner brake cable under emergency hand braking conditions.

12 Claims, 32 Drawing Figures

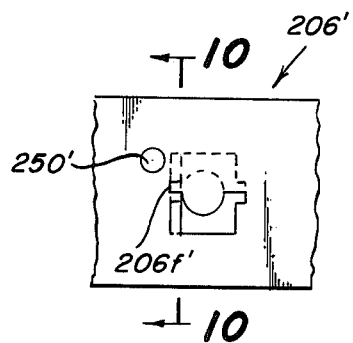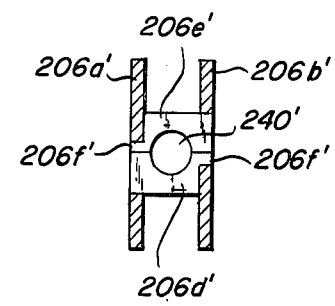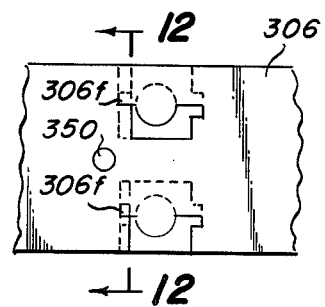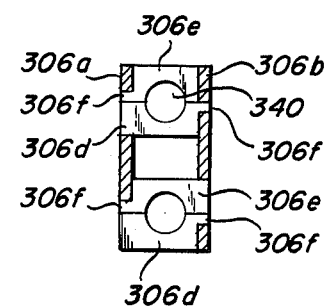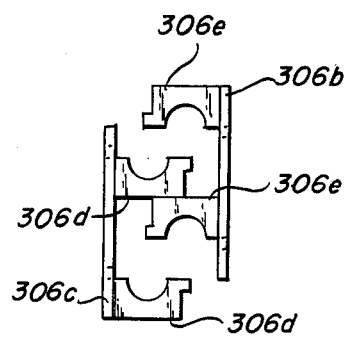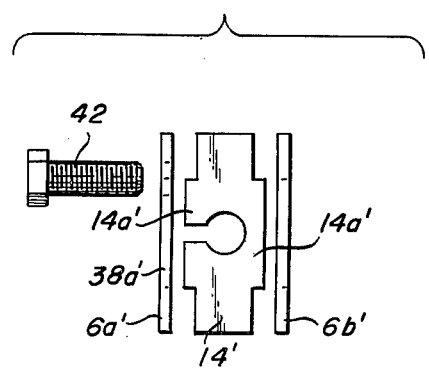

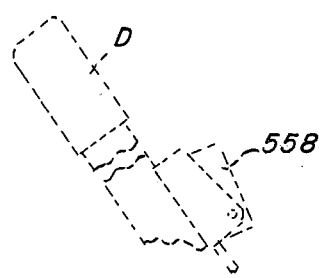
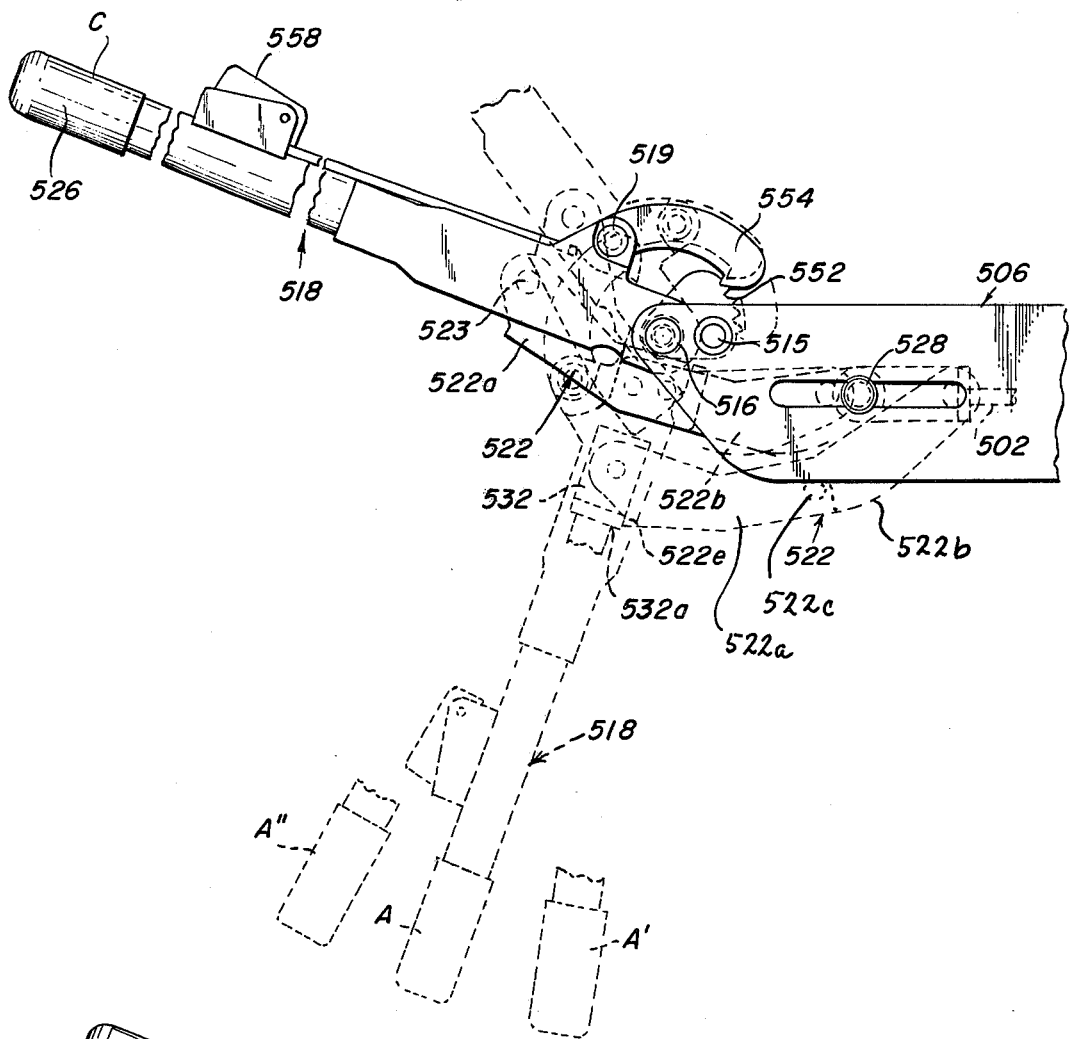
Fig. 17
Fig. 18
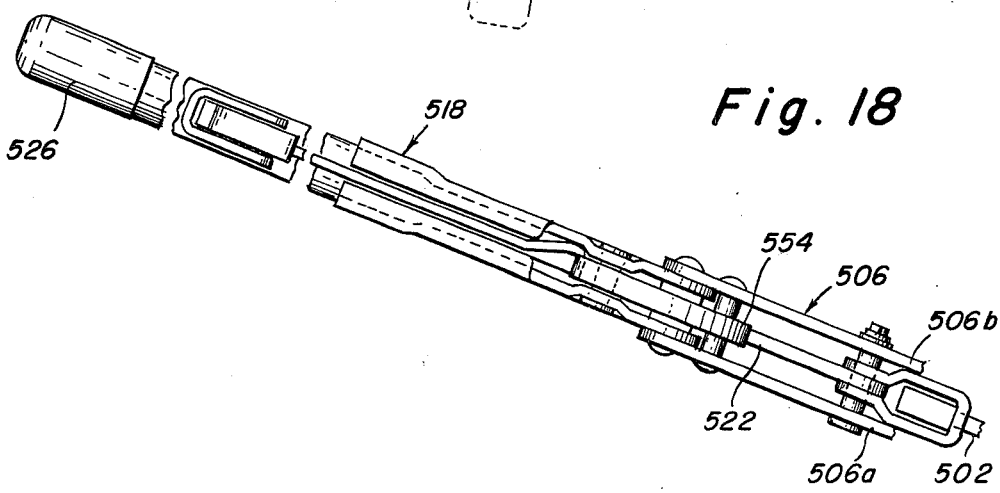

BRAKE CABLE OPERATING MEANS OF THE OVERCENTER TOGGLE TYPE

BRIEF DESCRIPTION OF THE PRIOR ART

In the prior U.S. patents to Orscheln No. 2,464,096 and Hirst No. 3,379,074 — each assigned to the same assignee as the present invention — brake cable operating means of the overcenter toggle type are disclosed for operating a brake cable between locked and released conditions. In these patents, a generally bow-shaped connecting link is provided that is pivotally connected at one end with the operating lever, and at the other end with the free end of the cable which in turn is guided for linear axial movement relative to the mounting plate assembly, whereby in the brake fully applied position of the operating lever, the pivotal connection between the lever and the link is displaced to a position overcenter from the pivot axis of the lever and the pivotal connection between the link and the mounting plate assembly. Tension adjustment means are normally provided which include means for displacing axially of the operating lever the pivotal connection between the lever and the connecting link, thereby to control the extent of displacement of the free end of the inner cable member relative to its stationary outer sheath, whereby the braking tension of the inner cable member may be controlled. The free end of the inner cable is connected with a transverse guide pin the ends of which extend through opposed linear guide slots contained in the spaced mounting plates. In the Orscheln Pat. No. 2,464,097, the connecting link is pivotally connected with a bell crank the pivotal displacement of which defines the output travel.

The above mentioned control mechanisms are of the overcenter toggle type and are adjustable by the vehicle operator to compensate for normal brake wear, a feature not available on most ratchet and pawl type mechanisms which rely on engagement of the pawl with the next ratchet sector tooth as the only means of adjustment available to the vehicle operator. However, even this means is often not adequate due to the insufficient mechanical advantage common to a relatively constant ratio ratchet and pawl type mechanism.

With the overcenter toggle type mechanism as previously mentioned, fine adjustment is available to produce the precise results desired. During the initial movement of the handle, a relatively large amount of travel with a low mechanical advantage is afforded with the output travel constantly decreasing and the mechanical advantage ratio constantly increasing as the handle moves to its overcenter locked position.

Although the overcenter toggle type control mechanism has performed well for many years, it is limited to being in either the released position (off) or in the overcenter locked position (on). In spite of the fine adjustment and high mechanical advantage, it is desired to provide a control mechanism that includes not only the advantages of the overcenter toggle means, but also the luxuries of the intermediate stops of a ratchet and pawl type control mechanism.

It is further desired to provide a control mechanism which includes the overcenter toggle means with a reserve of travel beyond the normal overcenter stop for use, for example, in emergency or panic situations where extra holdability is needed, but there is not time to make the necessary adjustment.

It is also desired to provide a control mechanism which includes the overcenter toggle means, the intermediate tooth stops of a ratchet and pawl means before the normal overcenter stop and reserve travel with tooth stops beyond the normal overcenter stop.

Referring to another aspect of the present invention, in the brake operating means of the Orscheln Pat. No. 2,464,096, the pivot axis of the operating lever is spaced from the end of the slots but on the same centerline, and although this combination has performed quite well in the past, it is subject to excessive wear on one side of the slots due to repeated cycling under relatively high loads, whereby the efficiency of the brake operating means is significantly reduced. This invention also requires additional parts in order to anchor a co-axial brake linkage to the mounting plate assembly.

The present invention was developed to avoid the above and other drawbacks of the known brake cable operating means.

SUMMARY OF THE INVENTION

Accordingly, the primary object of the present invention is to provide improved brake cable operating means of the overcenter toggle type including ratchet and pawl means for releasably locking the operating lever in desired angular positions relative to the mounting plate means.

In accordance with a more specific object of the invention, the bow-shaped connecting link which connects the free end of the inner cable member with the operating lever comprises a plurality of pivotally connected sections, thereby to afford reserve travel of the operating lever beyond the brake fully applied position upon emergency or panic hand braking conditions. This reserve travel of the operating lever is achieved with a reduced mechanical advantage ratio, whereby increased input force is required to utilize the reserve travel, thus making the use of such reserve travel a deliberate operation. The reduced mechanical advantage ratio is essential to avoid damaging the various components affected by the control mechanism. The availability of this reserve travel is provided primarily for use during emergency situations wherein the control system that is adjusted for normal use may not provide adequate results for such a situation.

Yet another object of the present invention is to provide a control mechanism of the overcenter toggle type including pawl and ratchet means affording intermediate stops between the released position and the normal overcenter locked position as well as beyond the normal overcenter locked position.

In accordance with another object of the present invention, the pivot axis of the operating lever is laterally offset from the guided linear axis of travel of the free end of the inner cable member relative to the mounting plate means and the outer sheath, thereby to achieve a more efficient brake operating means that is subject to less wear, and consequently has a longer life and less overcenter drop off.

According to a further object of the invention, improved simplified anchor means are provided which not only rigidly connect one end of the outer sheath of the cable assembly with the mounting plate means, but also serve to space the ends of the spacer plates at one end of the mounting means. In one embodiment, the anchor means comprises a transverse anchor plate which contains an opening in which the end of the outer sheath is mounted. The ends of the anchor plate contain projections that extend through corresponding openings in the mounting plates, thereby to stabilize and space the mounting plates. In a second embodiment, the anchor means comprise integral tab portions bent inwardly from, and extending at right angles to, the mounting plates, respectively, each tab having at its free end a projection that extends within a corresponding opening contained in the other plate. Consequently, since the use of at least one set of spacer means is eliminated, a fewer number of parts for the mounting plate assembly is required, and the mounting plate assembly may be more easily and quickly assembled.

BRIEF DESCRIPTION OF THE FIGURES

FIGS. 9 and 10 are detailed side elevation and sectional views, respectively, illustrating a modification of the integral bent tab anchor means of FIG. 7;

FIGS. 11 and 12 are detailed side elevation and sectional views, respectively, of a modification of the integral bent tab anchor means suitable for use with a double brake cable arrangement;

FIGS. 13 and 14 illustrate the manner of assembling the anchor means of the mounting plate assemblies of FIGS. 12 and 4, respectively;

FIGS. 17-19 are side elevation, top plan and detailed side elevation views, respectively, of a modification of the apparatus of FIG. 15, wherein ratchet and pawl means are provided for operation during pivotal movement of the operating lever between the brake fully applied position and a final reserve travel emergency position beyond the brake fully applied position;

DETAILED DESCRIPTION

Figure 1:
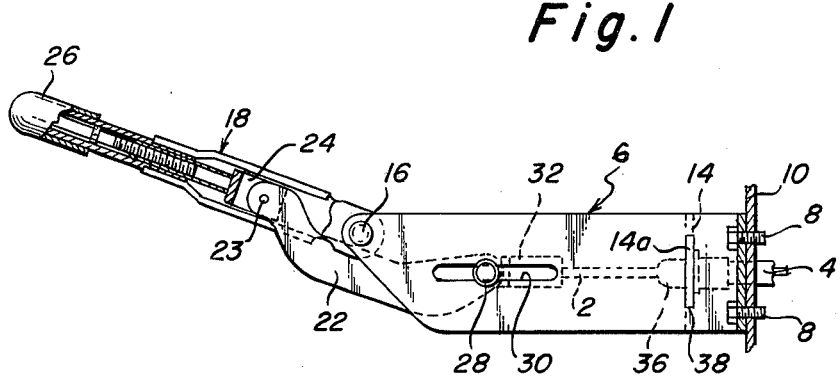
FIGS. 1 and 2 are side elevation and top plan views, respectively, of a first embodiment of the invention wherein the pivot axis of the operating lever is laterally offset from the guide axis of the inner cable member, and further including anchor means of the anchor plate type.
Figure 2:
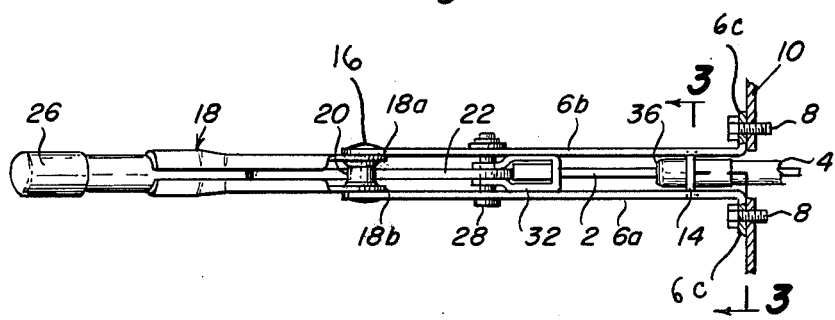
Figure 3:
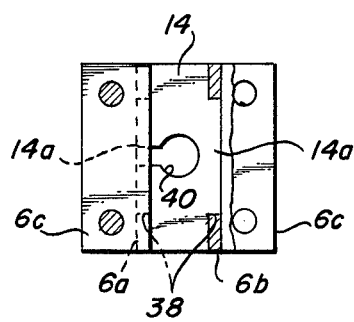
FIG. 3 is a sectional view taken along lines 3—3 of FIG. 2.

Referring now to FIGS. 1-3, the brake cable operating means for axially displacing the inner brake cable member 2 relative to the tubular outer sleeve member 4 includes mounting plate means 6 that is adapted to be bolted by bolts 8 to a fixed support 10, such as the firewall of a motor vehicle. The mounting plate means includes a pair of parallel spaced mounting plates 6a and 6b that are provided at one end with outturned flange portions 6c that are bolted to the fixed support 10. The ends of the mounting plates 6a and 6b are spaced by an anchor plate 14 as will be described in greater detail below. At their other ends, the mounting plates 6a and 6b are spaced by the rivet 16, the bifurcated arm portions 18a and 18b of the operating lever 18, and bushing spacer means 20. A bow-shaped connecting link 22 is pivotally connected at one end with a bifurcated U-shaped yoke member 24 that is axially displaceable relative to the operating handle 18 by screw thread operable tension adjusting knob 26, as is known in the art. At its other end, the connecting link 22 is pivotally connected with the central portion of a guide pin 28 the ends of which extend through linear guide slots 30 contained in the mounting plates 6a and 6b, respectively. Also mounted on the central portion of the guide pin 28 is a generally U-shaped yoke member 32 to which is connected the free end of the inner brake cable member 2. The adjacent end of the outer sheath member 4 is connected with the anchor plate 14 by means of a suitable ferrule 36. Examples of such anchoring ferrules are illustrated in the patents to Severence U.S. Pat. No. 3,366,405, Bratz U.S. Pat. No. 2,869,905, Brickman U.S. Pat. No. 2,954,248 and Benham U.S. Pat. No. 3,101,205, for example.

As shown in FIG. 3, the anchor plate 14 that extends transversely across the space between the mounting plates 6a and 6b includes at each end projections 14a that extend through corresponding opposed slots 38 contained in the mounting plates 6a and 6b, respectively. The anchor plate 14 contains a centrally arranged slot 40 for receiving the end of the cable sheath 4 which is connected with the anchor plate 14 by the anchoring ferrule 36. Thus, the anchor plate 14 serves both to stabilize and to maintain in spaced relation the mounting plates 6a and 6b of the mounting assembly 6.

Operation

In operation, as the operating lever 18 is pivoted in the clockwise direction from the brake released position toward the brake fully applied position of FIG. 1, the guide pin 28 is laterally displaced relative to the guide slots 30 to displace the free end of the inner cable member 2 away from the end of the outer sheath member 4 that is secured to the anchor plate 14 by the ferrule 36. Consequently, the pivot pin 23 between the connecting link 22 and the operating lever 18 is displaced overcenter from the plane containing the pivot axes 16 and 28, whereby the drop off in travel due to the handle movement past dead center is less than it would have been if the pivot axis 16 were in line with the direction of linear travel of the free end of the inner cable member 2 as defined by the slots 30, thereby providing additional positive travel.

Figure 4:
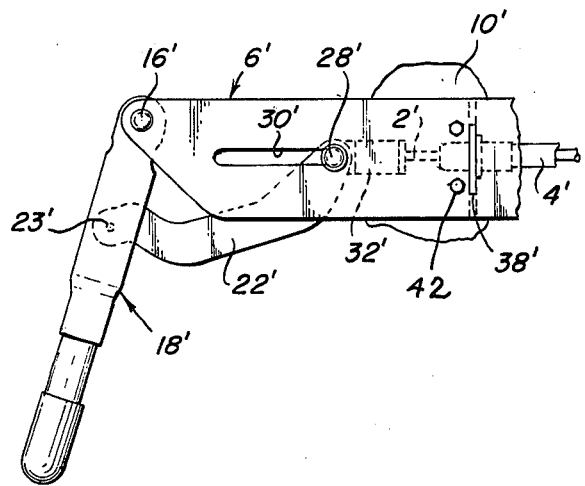
FIG. 4 illustrates the apparatus of FIG. 1 when the operating lever is in the brake released position.

Instead of securing the mounting plate means in an endwise connected fashion to the fixed support 10 as shown in FIGS. 1-3, the mounting plate means 6' could be bolted laterally to a fixed support 10' by means of bolts 42 that extend through aligned apertures in the mounting plates 6a' and 6b' as shown in FIG. 4.

Figures 5, 6:
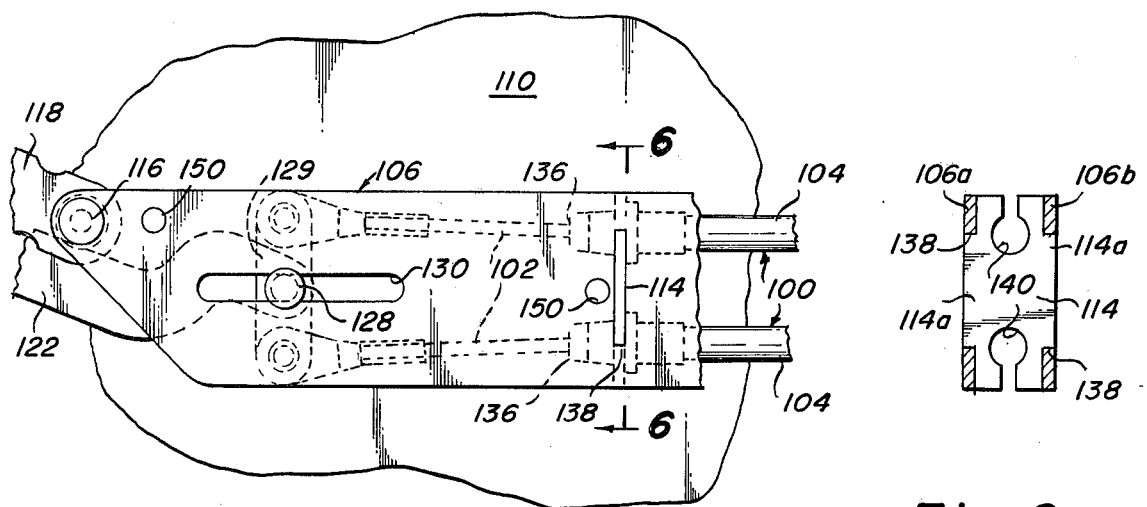
FIG. 5 illustrates a modification of the apparatus of FIGS. 1-4 wherein the apparatus is designed to operate a pair of brake cable assemblies.
FIG. 6 is a sectional view taken along line 6—6 of FIG. 5.

Referring now to the modification of FIG. 5, a double brake system is disclosed including a pair of brake cable assemblies 100 each having an inner cable member 102 and an outer sheath 104. In this embodiment, the free ends of the inner cable members 102 are connected with the opposite arms of an equalizer link 129 the center of which has a through bore receiving the guide pin 128. The adjacent free ends of the outer sheath members 104 are connected by ferrules 136 with a pair of slots 140 contained in the anchor plate 114. The anchor plate, which extends transversely between the spaced mounting plates 106a and 106b, is provided at opposite ends with projections 114a that extend within corresponding opposed recesses 138 contained in the parallel spaced mounting plates 106a and 106b. The mounting plates contain further aligned openings 150 for bolting the mounting plate assembly 106 in a side-mounted relation to a fixed support 110.

It is apparent that as the operating lever 118 is pivoted about the offset pivot axis 116 toward the brake fully applied position, the guide pin 128 is displaced to the left in the guide slots 130 to shift equalizer link 129 to the left and thereby displace the free ends of the inner cable members 102 from the adjacent ends of the outer sheath members 104, thereby to tension the inner cable members 102.

Figures 7, 8:
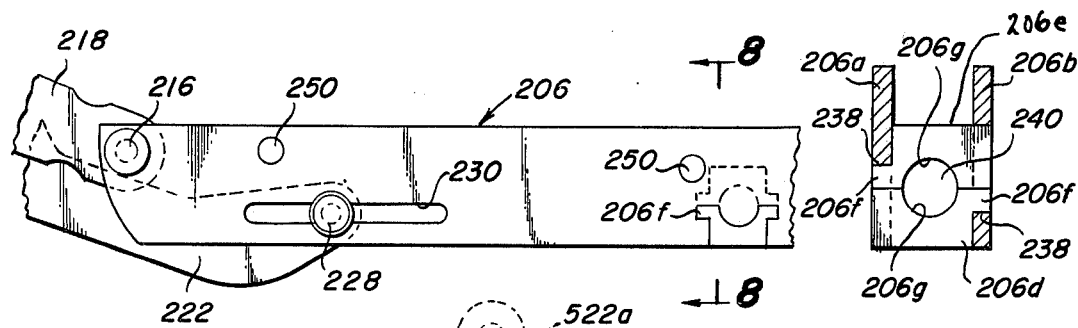
FIG. 7 is a detailed side elevational view of a second embodiment of the invention wherein the anchor means for the outer sheath are of the integral bent tab type.
FIG. 8 is a sectional view taken along line 8—8 of FIG. 7.

Referring now to the embodiment of FIGS. 7 and 8, the anchor plate means of FIGS. 1-6 are replaced by integral inwardly bent tab portions 206d and 206e that are formed from the parallel spaced mounting plates 206a and 206b, respectively. Each inwardly bent tab portion is provided at its free edge with a projection 206f that extends within a corresponding opening 238 contained in the mounting plates. The coplanar tab portions 206d and 206e contain at their adjacent edge portions opposed recesses 206g that cooperate to define a central opening 240 in which the free end of the outer sheath member is mounted by ferrule means, not shown. The mounting plates 206a and 206b contain aligned bolt openings 250 by means of which the mounting plate assembly 206 may be secured in a side-mounted manner to a fixed support.

In the modification of FIGS. 9 and 10, the integral inwardly bent anchor tab portions 206d' and 206e' are formed in the central portions of the mounting plates 206a' and 206b'.

Referring now to the double brake cable assembly embodiment of FIGS. 11 and 12, the mounting plates 306a and 306b are provided with a pair of integral inwardly bent tab portions 306d and 306e, respectively, which tab portions are coplanar and contain recesses that cooperate to define the pair of openings 340 in which the ends of the outer sheath members are secured by conventional ferrule means. The manner of assembling the mounting plates 306a and 306b to define the anchor openings 340 is illustrated in FIG. 13, and the manner of assembling the mounting plates of FIG. 4 is illustrated in FIG. 14.

Referring again to FIG. 1, it will be noted that as the operating lever 18 is pivoted past dead center toward its overcenter brake fully applied position, the connecting link 22 abuts the spacer bushing 20 to limit the amount of drop off owing to the past dead center movement of the operating lever 18. Owing to the offset arrangement of the operating lever pivot axis 16, there is less overcenter drop off than in the brake cable operating means of the prior art.

Figure 15:
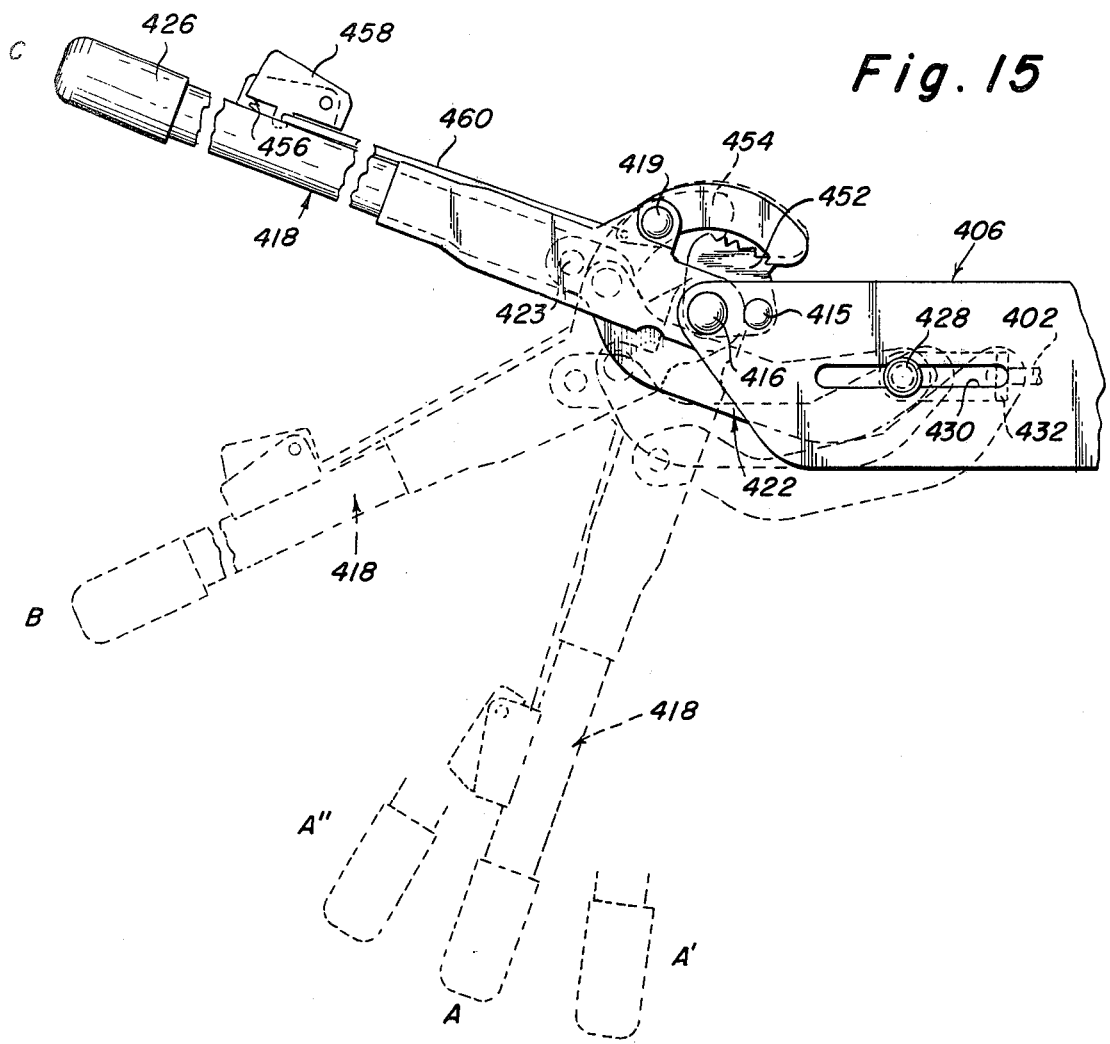
FIGS. 15 and 16 are side elevation and top plan views, respectively, of another embodiment of the invention wherein ratchet and pawl means are provided, the pivot axis of the operating lever being offset from the guide axis of the inner cable member.
Figure 16:
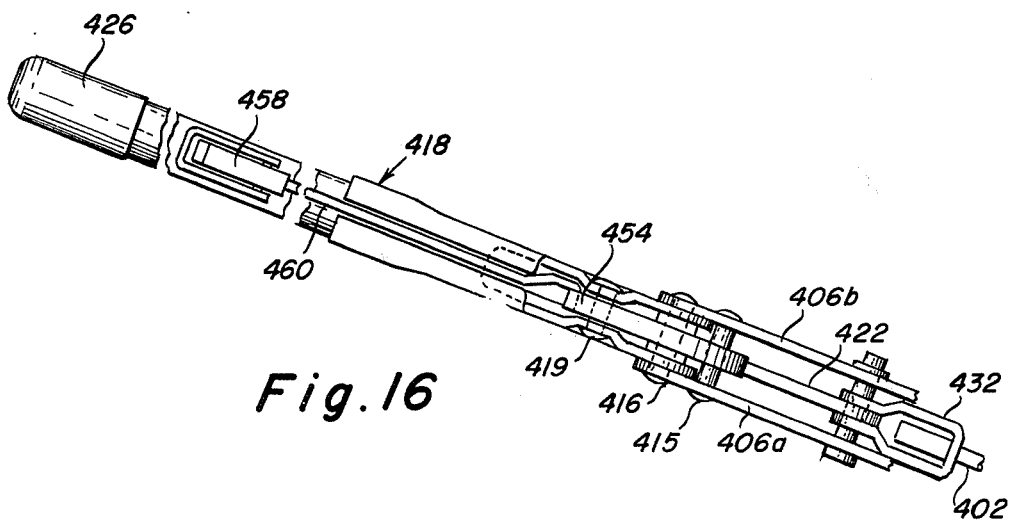

Referring now to the embodiment of FIGS. 15 and 16, a stationary ratchet 452 is provided that is secured to the mounting plate means 406 by the rivets 416 and 417. Furthermore, a pawl 454 is pivotally connected with the operating lever 418 by rivet 419. The pawl 454 is normally biased by spring 456 for engagement with the teeth of the ratchet 452, the release button 458 and connecting link 460 being operable to pivot the pawl 454 in the counterclockwise direction toward the released position relative to the teeth of the ratchet 452. As in the embodiment of FIG. 1, the operating lever 418 is provided with a rotatably adjusting knob 426 which is operable by screw thread means, not shown, to axially displace relative to the operating lever 418 the pivotal connection 423 between the operating lever and the connecting link 422. Thus, when the brake operating lever 418 is in the nominal off position A, the operating lever may be adjusted — by rotation of the knurled knob 22 — toward position A' for effecting maximum output travel of the guide pin 428, or to the off position A", which will produce minimum output travel of the guide pin 428.

In the embodiment of FIGS. 15 and 16, the ratchet means 452 are so designed that the teeth thereof are not engaged by the pawl 454 until the operating lever is pivoted to the intermediate position B illustrated in FIG. 15. Consequently, as the operating lever 418 is pivoted in the clockwise direction from the intermediate position B toward the overcenter brake fully locked position C, the pawl and ratchet means become operable to lock brake operating lever 418 against movement in the counterclockwise direction toward the brake released position. To release the operating lever from the brake fully applied position illustrated in solid lines in FIG. 15, the operator merely depresses the release button 458 to pivot pawl 454 in the counterclockwise direction about its pivot 419, whereupon the operating lever 418 may be pivoted in the counterclockwise direction toward the brake released position.

It will be seen that in the embodiment of FIGS. 15 and 16, the operating lever pivot axis 416 is offset from the plane containing the center lines of the guide slots 430 which define the linear axis of travel of the free end of the inner cable member 402. Consequently, the overcenter drop off is less than it would be if the pivot axis 416 were in line with the plane containing the guide slots 430 and the linear axis of travel of the free end of the inner cable member 402.

Figure 19:
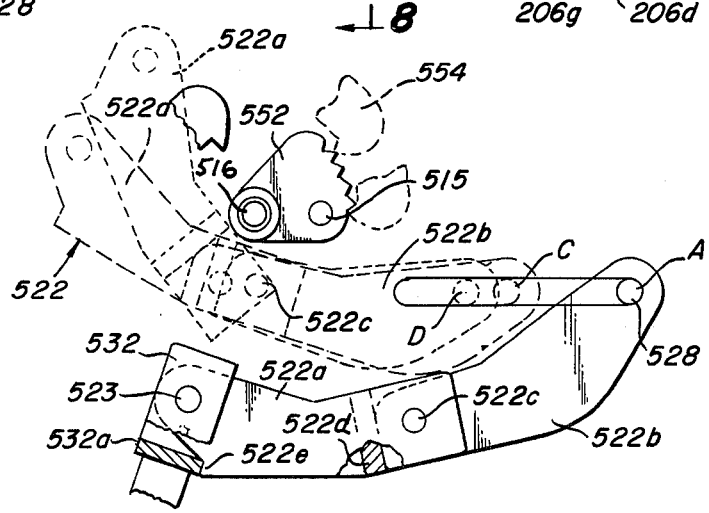

Referring now to FIGS. 17-19, a further embodiment of the invention is disclosed in which, for emergency braking conditions, the operating lever 518 may be pivoted in the clockwise direction beyond the brake fully applied position C illustrated in solid lines toward the final reserve travel position D, whereby additional braking tension may be applied to the inner brake cable 502. In this regard, the connecting link 522 comprises a pair of pivotally connected sections 522a and 522b that are connected by the pivot 522c. More particularly, as shown in FIG. 19, the section 522a is bifurcated at one end to receive the adjacent end of the section 522b, the end edge of the section 522c being arranged to abut a transverse wall 522d of the section 522a to prevent the sections — when in the extended position — from pivoting in the clockwise direction about the pivot shaft 522c.

As shown in FIGS. 17 and 19, as the operating lever 518 is pivoted in the clockwise direction from the off position A toward the brake fully applied position C, the connecting link 522 remains in its extended position, thereby to displace the guide pin 528 to the left and to correspondingly displace the free end of the inner cable member 502 to the left relative to the anchored end of the outer sheath member of the cable assembly. At this position, the pawl 554 engages the first tooth of the ratchet means 552. During continued pivotal movement of the operating lever 518 toward the final reserve travel position D, the sections 522a and 522b of the connecting link are bent around the pivot axis 516 of the operating lever 518, the pawl and ratchet means being operable during this pivotal movement of the operating lever from the brake fully applied position C to the final reserve travel position D. This pivotal movement of the operating lever between the positions C and D is accompanied by a reduced mechanical advantage factor, thereby making the utilization of the emergency reserve travel operation a deliberate operation by the operator. To pivot the operating lever 518 from the final reserve travel position D, the release button 558 is depressed to pivot the pawl in the counterclockwise direction relative to the ratchet means 552, whereupon the lever 518 may be pivoted in the counterclockwise direction toward the brake released position A. As in the prior embodiments, the tension adjusting knob 526 may be rotated to adjust the off position A to a position A' for maximum for maximum output travel, or to the position A" for minimum output travel. When in the brake released position A, the transverse wall 532a of the yoke member 532 engages a ledge 522e on the section 522a of the connecting link, thereby to prevent further pivotal movement of the operating lever 518 in the counterclockwise direction.

Figure 20:
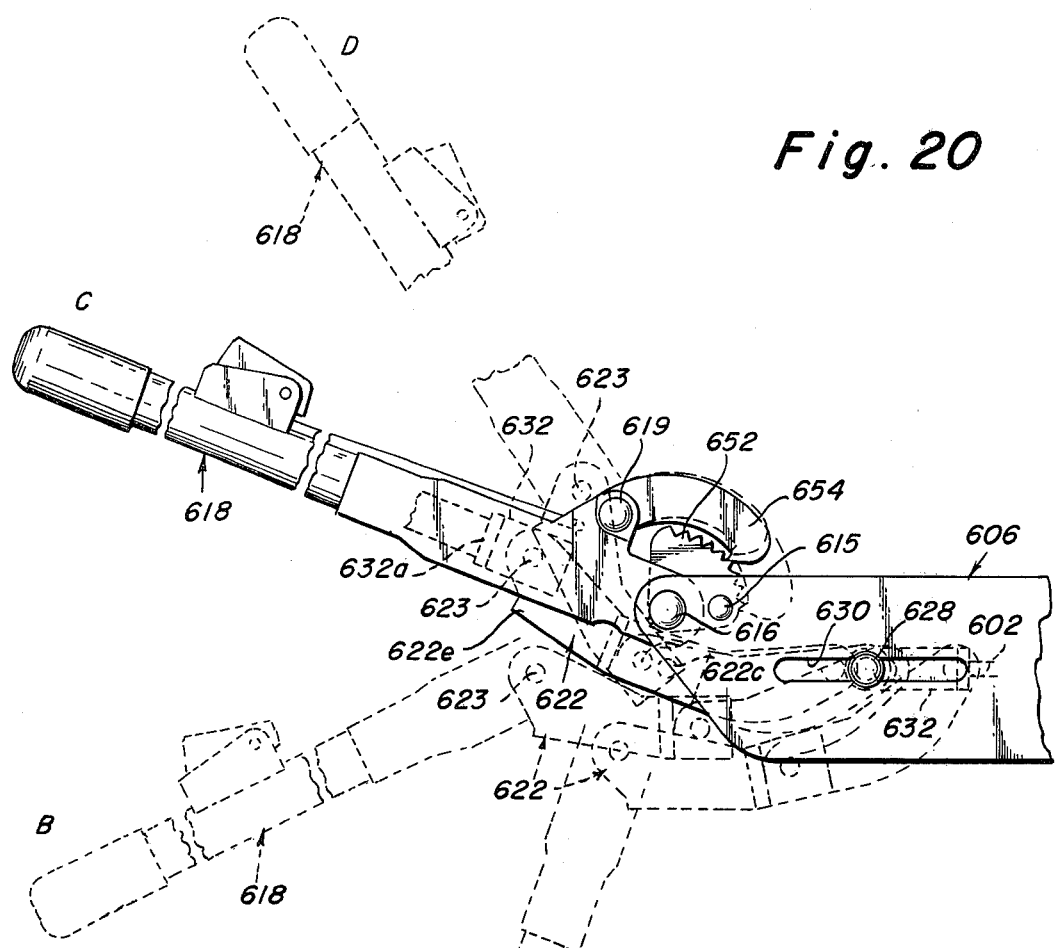
FIGS. 20-22 are side elevation, top plan and detailed views, respectively, of a modification of the apparatus of FIG. 17 wherein the pawl and ratchet means are operable during pivotal movement of the operating lever between the brake released position and the final reserve travel position beyond the brake fully applied position.
Figure 21:
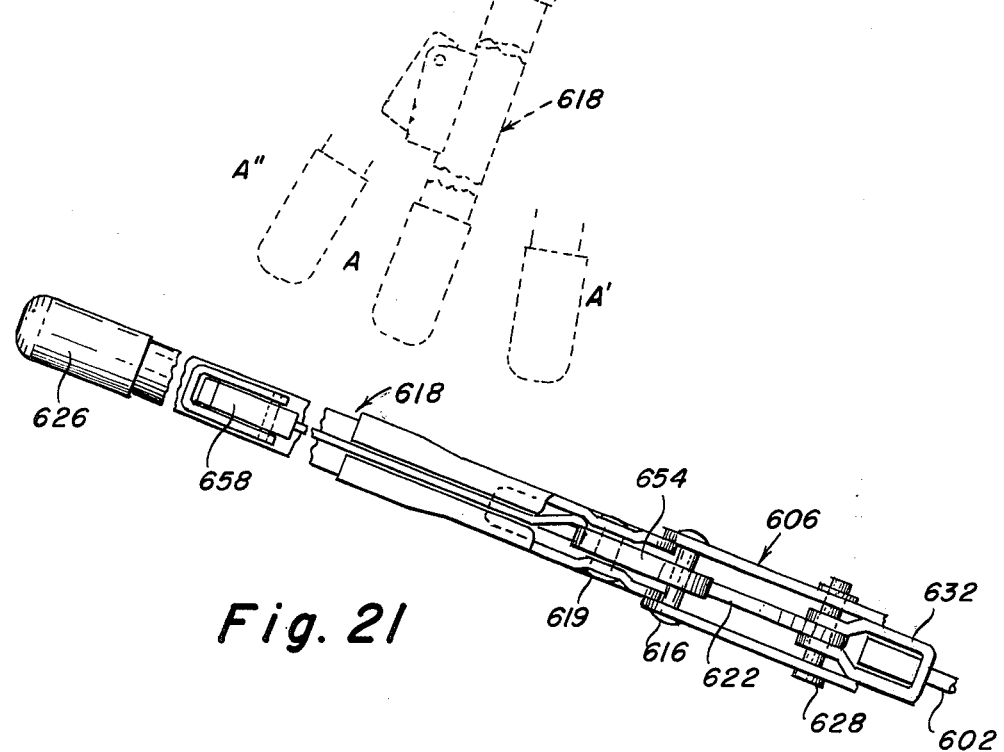
Figure 22:
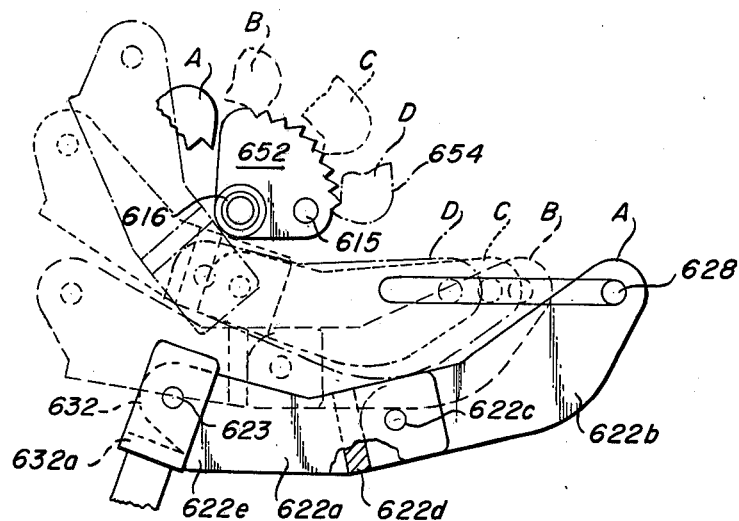
Figure 23:
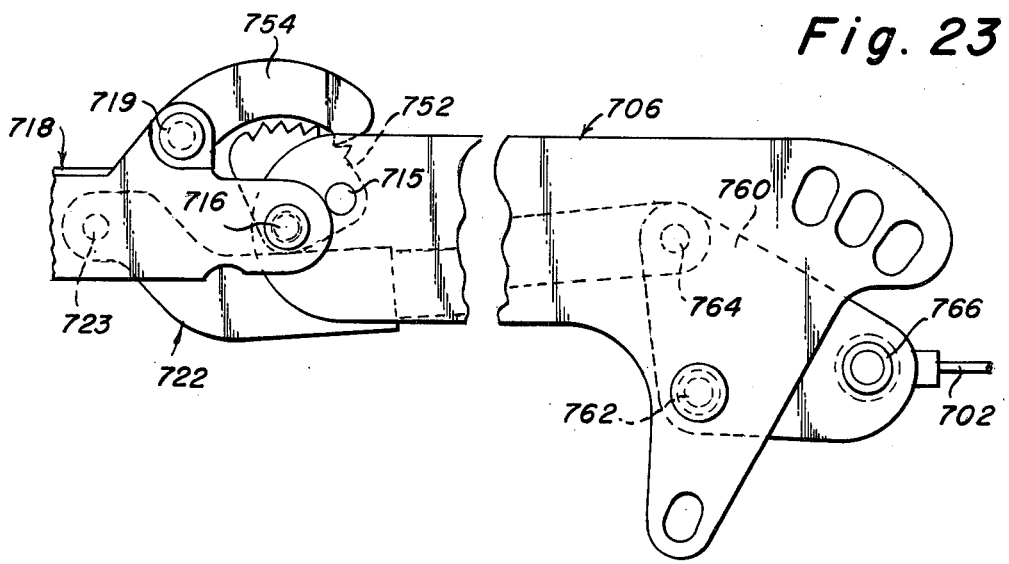
FIG. 23 is a side elevational view of a modification of the invention including bell crank means for guiding the inner cable member.

Referring now to the modification of FIGS. 20-22, the ratchet 652 is so designed that the first tooth thereof is engaged when the operating lever 618 is pivoted from the off position A to an intermediate braking position B. As the operating lever is further pivoted in the clockwise direction toward the overcenter brake fully applied position C and to the final reserve travel position D, the spring-biased pawl 654 continues to cooperate with the stationary pawl 652 to prevent rotation of the operating lever 618 in the counter-clockwise direction in order to release the operating lever 618 for pivotal movement in the counter-clockwise direction toward the brake released position A, the release button 658 is depressed to pivot the pawl in the counter-clockwise direction about its pivot axis 619. Referring now to the embodiment of FIG. 23, the guidepin and guideslot means of the previously described embodiments for effecting guiding movement of the free end of the inner cable member is replaced by bell crank guide means including a bell crank 760 that is pivotally connected with the mounting plate means 706 by pivot shaft 762, one end of the bell crank being pivotally connected with the unitary connecting link 722 by pivot shaft 764, and the other arm of the bell crank being pivotally connected with the free end of the inner cable member 702 by the pivot shaft 766. The ratchet means 752 is so designed that the pawl and ratchet means are operable as the operating lever 718 is pivoted from the intermediate locking position B to the overcenter brake fully locked position C.

Figure 24:
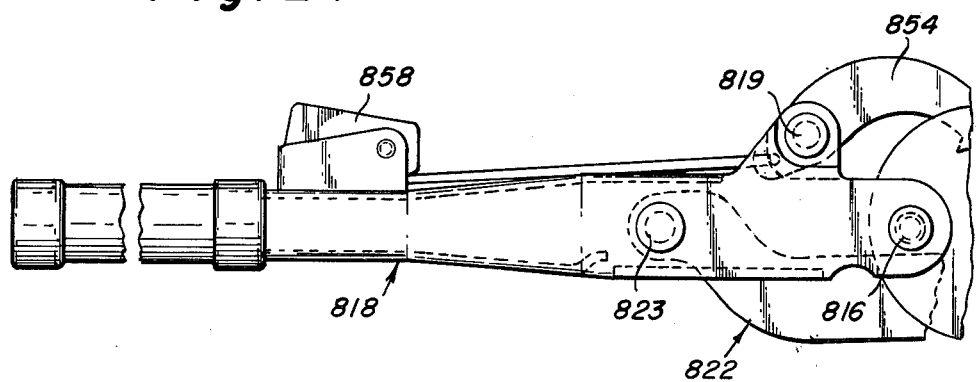
FIG. 24 is a detailed side elevational view of a modification of the invention wherein the use of tension adjustment means for the inner cable member is eliminated.

Referring now to the embodiment of FIG. 24, the provision of the adjusting means for displacing axially of the operating lever the pivotal connection 823 between the connecting link 822 and the lever 818 is eliminated. More particularly, the pivotal connection 823 is fixed relative to the operating lever 818. The operation of the pawl and ratchet locking means is effective to lock the operating lever in its overcenter brake fully applied position as described above.

Figure 25:
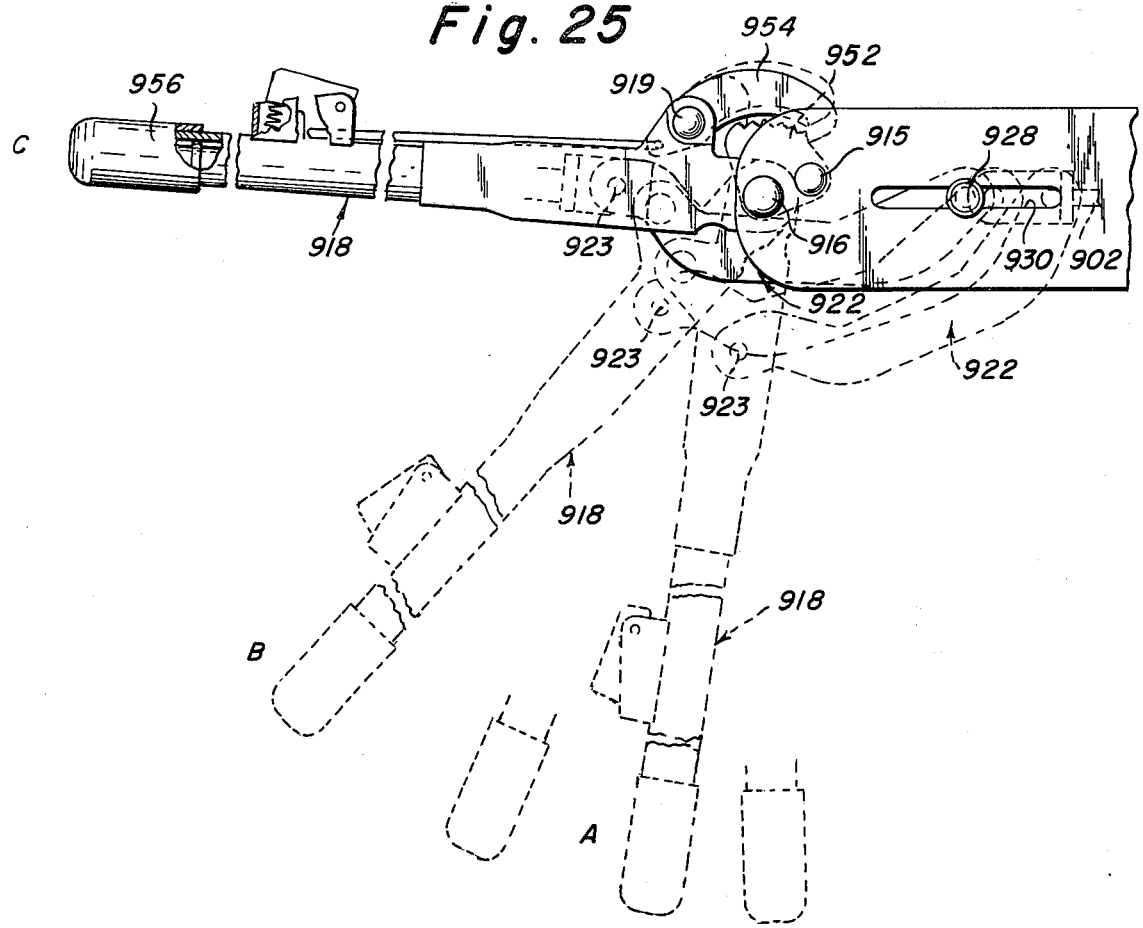
FIGS. 25 and 26 are side elevation and top plan views, respectively, of a modification of the embodiment of FIGS. 15 and 16 wherein the pivot axis of the operating lever is in line with the linear guide axis of the inner cable member.
Figure 26:
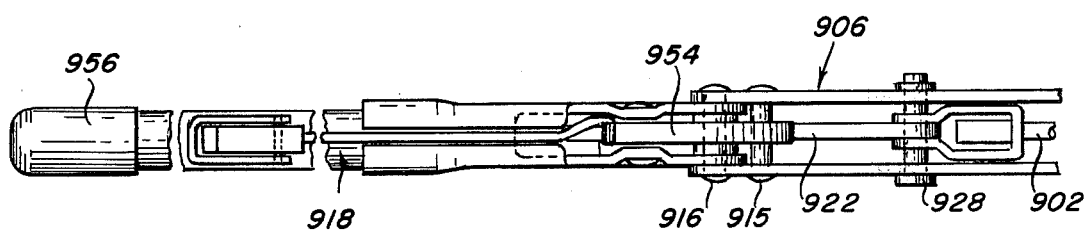
Figure 27:
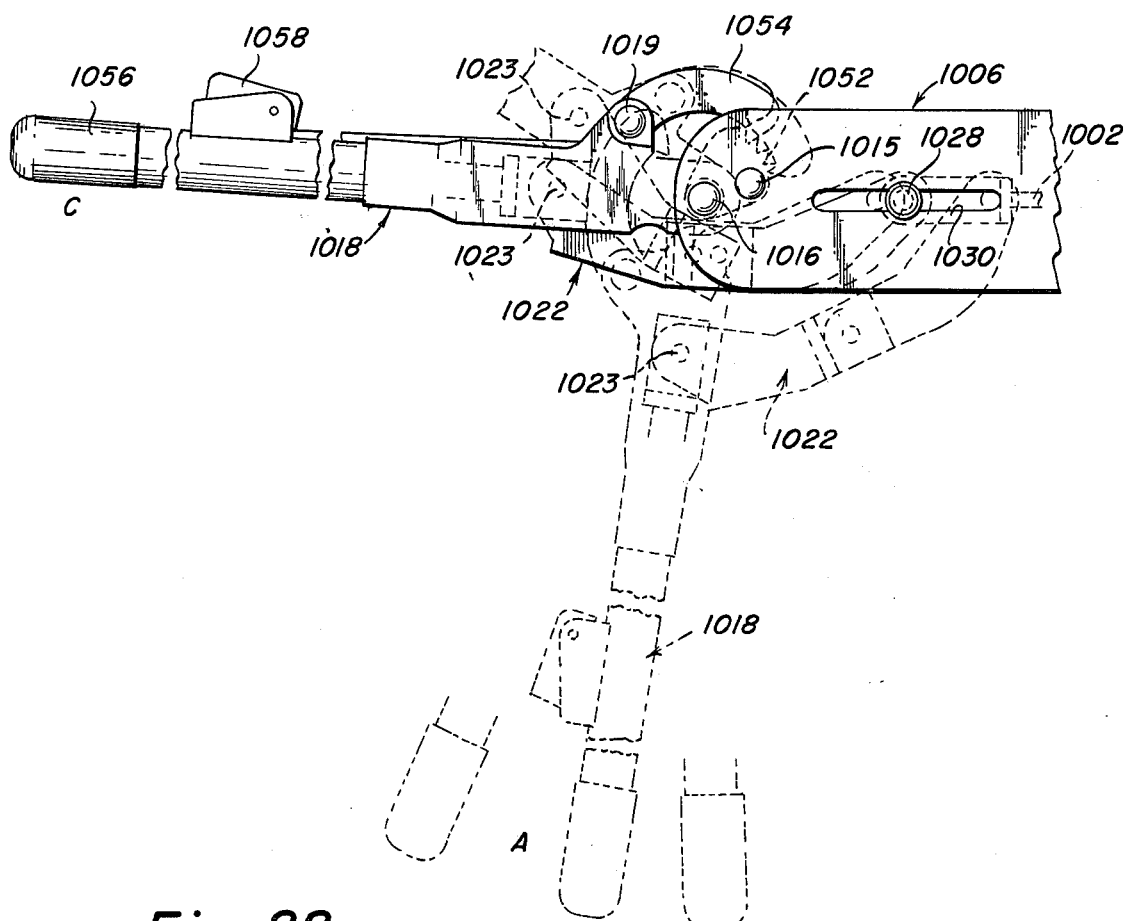
FIGS. 27-29 are side elevation, top plan and detail views, respectively, of a modification of the embodiment of FIGS. 17-19 wherein the pivot axis of the operating lever is in line with the linear guide axis of the inner cable member.
Figure 28:
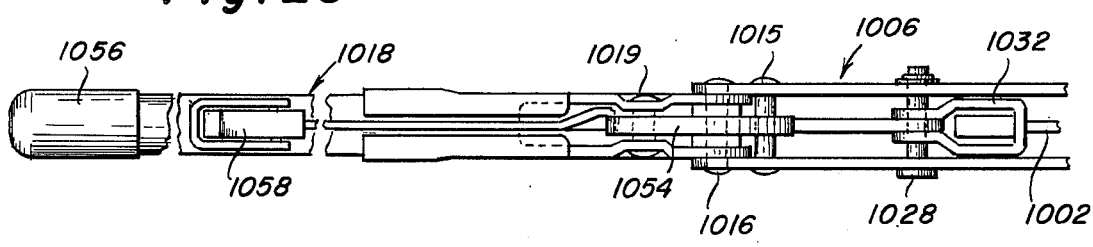
Figure 29:
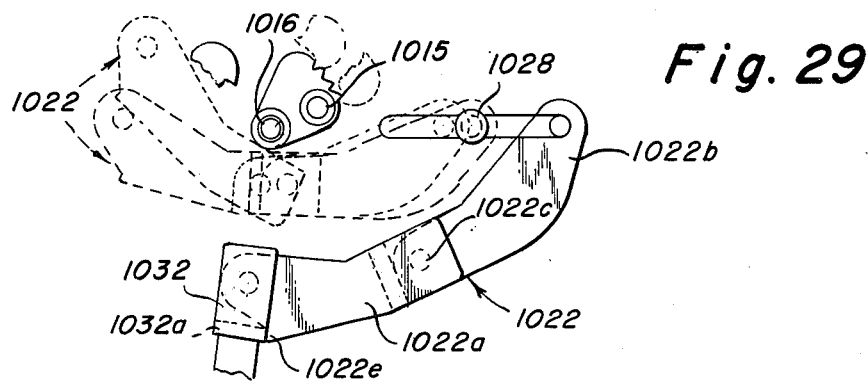
Figure 30:
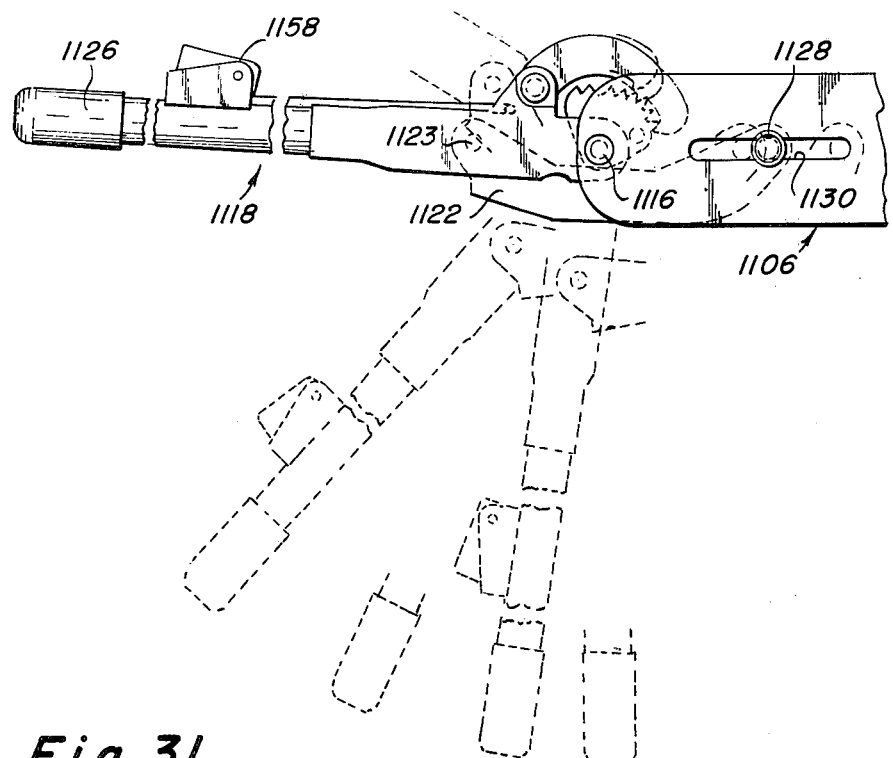
FIGS. 30-32 are side elevation, top plan and detail views, respectively, of a modification of the embodiment of FIGS. 20-22, wherein the pivot axis of the operating lever is in line with the linear guide axis of the inner cable member.
Figure 31:
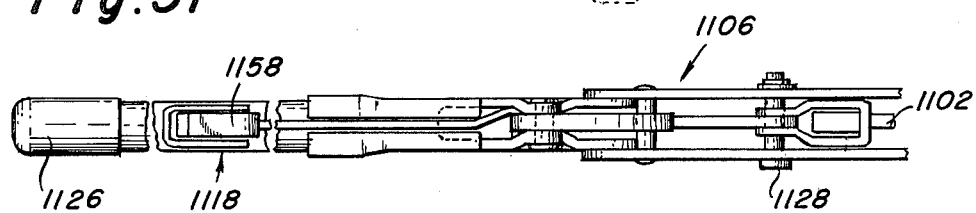
Figure 32:
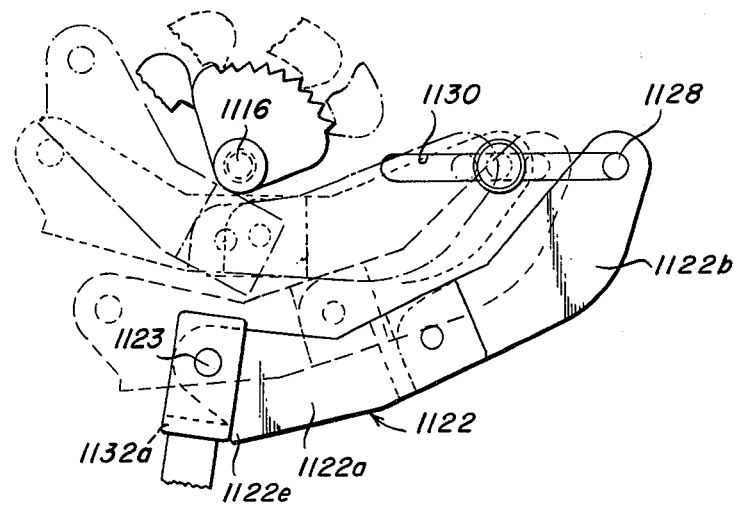

The embodiment of FIGS. 25 and 26 corresponds with that of FIGS. 15 and 16, the only difference being that the pivot axis 916 of the operating lever 918 is in line with the central axis of the guide slots 930 and consequently with the linear axis of travel of the inner cable member 902. Similarly, in the embodiment of FIGS. 27-29 — which corresponds with the embodiment of FIGS. 17-19 — the pivot axis 1016 of the operating lever 1018 is in line with the center line of the guide slots 1030. Finally, the embodiment of FIGS. 30-32 corresponds with the embodiment of FIGS. 20-22, the only difference being that the pivot axis 1116 of the operating lever 1118 is aligned with the guide axis of the slots 1130.

It is important to note that in the embodiments of FIGS. 1-22 — wherein the pivot axis of the operating lever is offset from the guide axis of the slots by which the free end of the inner cable member is guided for linear axial displacement — the initial displacement of the operating lever is initially relatively fast with relatively low mechanical advantage and constantly decreasing (displacement) as the lever handle pivots through its arc, and to the over-center locked position with a high mechanical advantage as the lever handle reaches the top dead center position. As the lever handle pivots to the overcenter locked position from top dead center, output travel and mechanical advantage are negative in direction and referred to as overcenter drop-off. The amount of overcenter drop off is less with the off-center pivot type control mechanism than with the centerline pivot type. In the embodiments of FIGS. 17-22 provided with reserve travel control, when the operating lever is pivoted beyond the normal overcenter locked position (causing the connecting link to fold about the pivot axis of the operating lever), a mechanical advantage factor is achieved. The mechanical advantage for the travel beyond the over-center locked position is relatively constant and at a significantly reduced ratio, whereby the utilization of the reserve travel is desired and deliberate such as in an emergency or panic braking situation.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Brake cable operating means of the overcenter toggle type for axially displacing the inner cable member of a coaxial brake cable assembly relative to the concentrically arranged tubular outer sheath member, comprising
   (a) mounting plate means adapted for connection with a fixed support, said mounting plate means including a pair of spaced parallel mounting plates;
   (b) anchor means rigidly connecting one end of the outer sheath member between said plates at one end of said mounting plate means, thereby to prevent axial displacement of said outer sheath member relative to said mounting plate means, said inner cable member extending axially beyond said outer sheath member and through said anchor means into the space between said plates;
   (c) guide means connecting the free end of the inner cable member with said mounting plate means for linear axial displacement relative to said outer sheath member;
   (d) an operating lever pivotally connected at one end with the other end of said mounting plate means, the pivot axis of said operating lever being normal to said plates; and
   (e) a generally bow-shaped rigid non-extensible connecting link pivotally connected at opposite ends with an intermediate portion of said lever and with the free end of said inner cable member, respectively, the pivot axis of said link being parallel with the pivot axis of said operating lever, said operating lever being pivotable between brake released and brake applied positions in which the free end of the inner cable member is displaced toward and away from the said one end of the outer sheath member, respectively, the pivotal connection between said lever and said link and the central portion of said link being arranged, when said lever is in the brake fully applied position, on opposite sides of the plane containing the pivot axis of the lever and the axis of the pivotal connection between said link and the inner cable member;
   (f) the pivot axis of said lever being laterally offset from the plane which extends normal to said mounting plates and which contains the guide axis of linear displacement of the free end of said inner cable member, thereby to reduce wear on said guide means and to provide greater efficiency in the operation of said brake cable operating means;
   (g) said connecting link including a pair of pivotally connected sections that are foldable to permit movement of the operating lever beyond the overcenter brake fully applied position, thereby to afford reserve travel of the inner brake cable at a reduced mechanical advantage under emergency brake-operating conditions.

2. Apparatus as defined in claim 1, wherein said connecting link sections are foldable only in one direction from their normal extended aligned condition, and further including means for maintaining said connecting link sections in their normal extended aligned condition when said operating lever is in the brake released position.

3. Apparatus as defined in claim 1, and further including ratchet and pawl means for releasably locking said operating lever in desired angular positions relative to said mounting plate means, said pawl and ratchet means being arranged for mutual cooperation when said operating lever is pivoted beyond the overcenter brake fully applied position toward the final reserve travel position.

4. Apparatus as defined in claim 3, wherein said pawl and ratchet means is operable to lock said operating lever in an intermediate position between the brake released and the overcenter brake fully applied positions.

5. Apparatus as defined in claim 1, and further including inner cable tension adjusting means for adjusting axially of the operating lever the position of the pivotal connection between said connecting link and said lever, thereby to vary the degree of displacement and tension of the inner cable member when the lever is in the brake fully applied position.

6. Brake cable operating means of the overcenter toggle type for axially displacing the inner cable member of a coaxial brake cable assembly relative to the concentrically arranged tubular outer sheath member, including
   (a) mounting plate means adapted for connection with a fixed support, said mounting plate means including a pair of spaced parallel mounting plates;
   (b) anchor means rigidly connecting one end of the outer sheath member between said plates at one end of said mounting plate means, thereby to prevent axial displacement of said outer sheath member relative to said mounting plate means, said inner cable member extending axially beyond said outer sheath member and through said anchor means into the space between said plates;
   (c) guide means, connecting the free end of the inner cable member with said mounting plate means for linear axial displacement relative to said outer sheath member;
   (d) an operating lever pivotally connected at one end with the other end of said mounting plate means, the pivot axis of said operating lever being normal to said plates;
   (e) a generally bow-shaped rigid non-extensible connecting link pivotally connected at opposite ends with an intermediate portion of said lever and with the free end of said inner cable member, respectively, the pivot axis of said link being parallel with the pivot axis of said operating lever, said operating lever being pivotable between brake released and brake applied positions in which the free end of the inner cable member is displaced toward and away from the said one end of the outer sheath member, respectively, the central portion of the link and the pivotal connection between said lever and said link being arranged, when said lever is in the brake fully applied position, on opposite sides of the plane containing the pivot axis of the lever and the axis of the pivotal connection between said link and the inner cable member, said connecting link comprising a pair of pivotally connected sections that are foldable to permit movement of the operating lever beyond the overcenter brake fully applied position, thereby to afford reserve travel of the inner brake cable at a reduced mechanical advantage under emergency brake-operating conditions; and
   (f) ratchet and pawl means for releasably locking said operating lever in desired angular positions relative to said mounting plate means.

7. Apparatus as defined in claim 6, wherein said connecting link sections are foldable only in one direction from their normal extended aligned condition, and further including means for maintaining said connecting link sections in their normal extended aligned condition when said operating lever is in the brake released position.

8. Apparatus as defined in claim 6, wherein said pawl and ratchet means are arranged for mutual cooperation when said operating lever is pivoted beyond the overcenter brake fully applied position toward the final reserve travel position.

9. Apparatus as defined in claim 8, wherein said pawl and ratchet means are opeable to lock said operating lever in an intermediate position between the brake released and the overcenter brake fully applied positions.

10. Apparatus as define in claim 6, and further including inner cable tension adjusting means for adjusting axially of the operating lever the position of the pivotal connection between said connecting link and said lever, thereby to vary the degree of displacement and tension of the inner cable member when the lever is in the brake fully applied position.

11. Apparatus as defined in claim 6, wherein said pawl and ratchet means are operable during travel of the operating lever between the brake released and final reserve travel positions.

12. Apparatus as defined in claim 6, wherein said connecting link means includes stop ledge means for preventing pivotal movement of said operating lever beyond the brake released position.

* * * * *